United States Patent
Ishizaki

(10) Patent No.: US 9,098,319 B2
(45) Date of Patent: Aug. 4, 2015

(54) CODE CONVERSION METHOD, PROGRAM, AND SYSTEM FOR GARBAGE COLLECTION

(71) Applicant: International Business Machines Corporation, Armonk, NY (US)

(72) Inventor: Kazuaki Ishizaki, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/028,579

(22) Filed: Sep. 17, 2013

(65) Prior Publication Data

US 2014/0082598 A1    Mar. 20, 2014

(30) Foreign Application Priority Data

Sep. 20, 2012   (JP) .................................. 2012-207105

(51) Int. Cl.
| | |
|---|---|
| G06F 9/44 | (2006.01) |
| G06F 9/45 | (2006.01) |
| G06F 9/455 | (2006.01) |
| G06F 11/36 | (2006.01) |

(52) U.S. Cl.
CPC ............ *G06F 9/45516* (2013.01); *G06F 8/443* (2013.01); *G06F 8/445* (2013.01); *G06F 11/3636* (2013.01)

(58) Field of Classification Search
CPC ..... G06F 8/443; G06F 8/445; G06F 9/45504; G06F 9/45516; G06F 11/3466; G06F 11/3636
See application file for complete search history.

(56) References Cited

U.S. PATENT DOCUMENTS

| | | | | |
|---|---|---|---|---|
| 6,546,550 | B1 * | 4/2003 | Ogata et al. ................... | 717/148 |
| 7,024,437 | B2 * | 4/2006 | Garthwaite ................... | 717/148 |
| 7,565,386 | B2 * | 7/2009 | Joisha ......................... | 707/999.2 |
| 7,620,943 | B1 * | 11/2009 | Garthwaite ................... | 717/151 |
| 7,693,919 | B2 | 4/2010 | Joisha | |
| 8,533,699 | B2 * | 9/2013 | Moir et al. .................... | 717/151 |
| 8,782,610 | B2 * | 7/2014 | Odaira et al. ................. | 717/128 |
| 8,819,649 | B2 * | 8/2014 | Lafreniere et al. ............ | 717/148 |
| 2005/0240914 | A1 * | 10/2005 | Anderson et al. ............. | 717/148 |
| 2007/0198617 | A1 * | 8/2007 | Joisha .......................... | 707/206 |

(Continued)

FOREIGN PATENT DOCUMENTS

JP    2003-050740 A    2/2003

OTHER PUBLICATIONS

Joao et al., "Flexible Reference-Counting-Based Hardware Acceleration for Garbage Collection", 2009 ACM, ISCA'09, Jun. 20-24, 2009, Austin, Texas, USA, pp. 1-11; <http://dl.acm.org/results.cfm?h=1&cfid=646836014&cftoken=84377714>.*

Hou et al., "A Single-Trace Cycle Collection for Reference Counting Systems", 2009 IEEE, ISPAN'09, Dec. 14-16, 2009, pp. 40-45; <http://ieeexplore.ieee.org/stamp/stamp.jsp?tp=&arnumber=5381976>.*

(Continued)

*Primary Examiner* — Thuy Dao
*Assistant Examiner* — Ben C Wang
(74) *Attorney, Agent, or Firm* — Scully, Scott, Murphy & Presser, P.C.; Jeff Tang, Esq.

(57) ABSTRACT

An improved technique for inserting reference count code in a garbage collection technique. When there are two or more successor basic blocks to a basic block, a given variable is live at the entry of one or more of the successor basic blocks, and the variable is dead in another basic block S, a new basic block is inserted between the original basic block and a successor basic block in which the variable is dead, and RC− related to the variable is generated in the new basic block.

13 Claims, 5 Drawing Sheets

(56) References Cited

U.S. PATENT DOCUMENTS

| | | | |
|---|---|---|---|
| 2007/0226281 A1* | 9/2007 | Joisha | 707/206 |
| 2008/0147696 A1* | 6/2008 | Ishizaki | 707/101 |
| 2009/0094300 A1* | 4/2009 | Joisha | 707/206 |
| 2009/0094301 A1* | 4/2009 | Joisha | 707/206 |
| 2010/0229159 A1* | 9/2010 | Odaira et al. | 717/128 |
| 2010/0306741 A1* | 12/2010 | Ishizaki et al. | 717/119 |
| 2012/0233602 A1* | 9/2012 | Ramaswamy et al. | 717/148 |
| 2013/0014088 A1* | 1/2013 | Park et al. | 717/128 |
| 2014/0006473 A1* | 1/2014 | Raghunathan et al. | 709/201 |
| 2014/0317607 A1* | 10/2014 | Adi-Tabatabai et al. | 717/146 |
| 2014/0331201 A1* | 11/2014 | Adl-Tabatabai et al. | 717/106 |

OTHER PUBLICATIONS

Håkan Sundell, "Wait-Free Reference Counting and Memory Management", 2005 IEEE, IPDPS'05, Apr. 4-8, 2005, pp. 1-10; <http://ieeexplore.ieee.org/stamp/stamp.jsp?tp=&arnumber=1419843>.*

Paz et al., "Using Prefetching to Improve Reference-Counting Garbage Collectors", Springer-Verlag Berlin Heidelberg 2007, Mar. 26-30, 2007, LNCS 4420, pp. 48-63; <http://link.springer.com/chapter/10.1007%2F978-3-540-71229-9_4#page-1>.*

Pramod G. Joisha, A principled approach to nondeffered reference-counting garbage collection, 2008, Hewlett-Packard Laboratories.

* cited by examiner

CODE CONVERSION METHOD, PROGRAM, AND SYSTEM FOR GARBAGE COLLECTION

CROSS-REFERENCE

This application claims priority under 35 U.S.C. §119 from Japanese Patent Application No. 2012-207105 filed on Sep. 20, 2012 the entire contents of which are incorporated herein by reference.

TECHNICAL FIELD

The present invention relates to a garbage collection technique for a computer and, more specifically, to a reference counting-style garbage collection technique.

BACKGROUND

Because reference counting-style garbage collection (GC) has a short pause time, and a high affinity for programming languages that do not have garbage collection (such as C), it has been implemented in many programming languages.

In order to implement reference counting-type garbage collection, the appropriate code has to be inserted for an integer counter indicating the number of times each object has been used ((RC+) for increment and (RC−) for decrement). When the counter is lowered to zero by RC−, the object is reclaimed.

The techniques described in the following patent publications are typical prior art examples of reference counting-style garbage collection.

A device has been disclosed in Laid-Open Patent Application No. 2003-50740 in which effective garbage collection is performed by suppressing memory use when the number of times a memory cell is referenced momentarily reaches a high peak value during the operation of an application program. Small bit string counters are provided in each memory cell so that the peak value for the number of times the memory cell is referenced cannot be represented, and the garbage collection device increments or decrements the counter within a range less than or equal to the maximum value expressed by the bit strings by a counter changing unit when pointers are changed to the memory cell by the application program. When a counter reaches zero, the memory cell is released by a cell releasing unit, and a recounting unit checks the number of times each memory cell has been referenced when there is insufficient memory by tracing the pointer chain from the route pointer. A counter resetting unit releases memory cells whose result is zero, and sets the counter of the memory cells whose result is not zero to the number in the check result.

In the prior art technique described above, the RC+/RC− is inserted explicitly at the beginning in a predetermined position in the code. However, more recently, techniques have been proposed, as described in U.S. Pat. No. 7,693,919 and Joisha, P. G., (2008). Principled Approach to Nondeffered Reference-Counting Garbage Collection. *VEEE.*, in which optimization is performed at an intermediate language level without initially inserting RC+/RC−. Here, the RC+/RC− is inserted at the later phase. This makes optimization easier to apply in compilers.

However, when RC+/RC− is inserted in accordance with the technique described in U.S. Pat. No. 7,693,919 and previously mentioned Joisha (2008), 1) an operation has to be performed to render the address of an object NULL after the last use of the object, 2) RC− is required in successor BB (basic blocks) in the case of variables whose life time has been closed in a BB, and 3) a check is required to determine whether or not the address of an object has been rendered NULL using RC−.

SUMMARY

It is an object of the present invention to provide a technique to insert reference count code that represents an improvement over the prior art in a garbage collection technique.

The present invention has been conceived to solve the problem described above. When there are two or more successor basic blocks (successor BB) to a basic block (BB), a given variable is live (live) at the entry of one or more of the successor basic blocks S, and the variable is dead in another basic block S, (a) a new basic block is inserted between the original basic block and a successor basic block in which the variable is dead, and RC− related to the variable is generated in the new basic block.

When written in equation form, the following is obtained.

$$\left( \bigcup_{s \subseteq Succ(B) \land s \neq S} live_{in}(s) \right) \cap \neg live_{in}(S) \qquad \text{Equation 1}$$

A new basic block is generated between basic block B and basic block S, and RC− for a variable of the equation that is not empty is generated. In this equation, Succ(B) is a set of successor basic blocks to basic block B, and livein(s) is a set of variables that are live at the entry of the basic block s. In addition, S is included in Succ(B).

In another aspect of the present invention, (b) if a variable identical to a variable that is live at the entry of one or more basic blocks among the successor basic blocks is dead in another one or more basic blocks, RC− code is generated at the entry of the successor basic blocks when the number of basic blocks preceding the successor basic blocks where the variable is dead is 1, and RC− code is generated at the entry of the successor basic blocks when the number of basic blocks preceding the successor basic blocks S where the variable is dead is 2 or more and the variable is live at the exits of all of the preceding basic blocks. If neither situation occurs, the technique in (a) is applied.

Unlike the prior art, the reference counting-style garbage collection of the present invention does not require the following operations to reduce the amount of code generated and shorten execution paths:

- The address of an object does not have to be rendered NULL after the last use of the object.
- RC− does not have to be used in successor basic blocks in the case of variables whose life time has been within a basic block.
- A check is not required to determine whether or not the address of an object has been rendered NULL using RC−.

DETAILED DESCRIPTION

The following is an explanation of embodiments of the present invention with reference to the drawings. The embodiments of the present invention are used to explain the best mode of carrying out the present invention, and are not intended to limit the scope of the present invention in any way. In all of the drawings, identical objects are denoted by the same reference numbers unless otherwise indicated.

Figure 1:
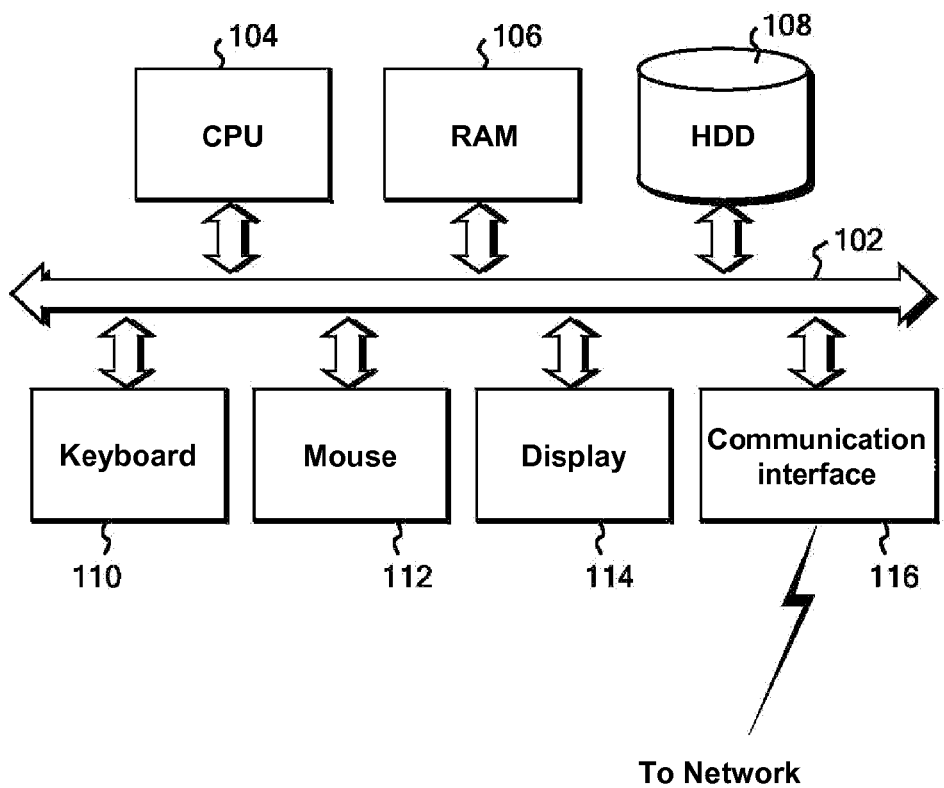
FIG. 1 is a block diagram of the hardware configuration used to embody the present invention.

FIG. 1 is a block diagram of computer hardware used to realize the system configuration and processing in an embodiment of the present invention. In FIG. 1, a CPU 104, main memory (RAM) 106, a hard disk drive (HDD) 108, a keyboard 110, a mouse 112, and a display 114 are connected to a system bus 102. The CPU 104 is preferably based on 32-bit or 64-bit architecture. Examples that can be used include Pentium™ 4 from Intel Corporation, CORE™ 2DUO from Intel Corporation, and Athlon™ from Advanced Micro Devices, Inc. The main memory 106 preferably has a capacity of 2 GB or more, and more preferably a capacity of 4 GB or more.

An operating system (OS) 202 (FIG. 2) is stored in the hard disk drive 108. The operating system 202 can be any operating system compatible with the CPU 104. Examples include Linux™, Windows 7™, Windows XP™ and Windows Server 2003™ from Microsoft Corporation, and Mac OS X™ from Apple, Inc.

A program for operating the system as a Web server, such as Apache, is stored on the hard disk drive 108, and loaded into the main memory 106 when the system is started up.

A CPython program for realizing a Python virtual machine (PVM) 204 (FIG. 2) is also stored on the hard disk drive 108, and loaded into the main memory 106 when the system is started up.

In addition, the byte code 206 (FIG. 2) of an application program is also stored on the hard disk drive 108.

Figure 2:
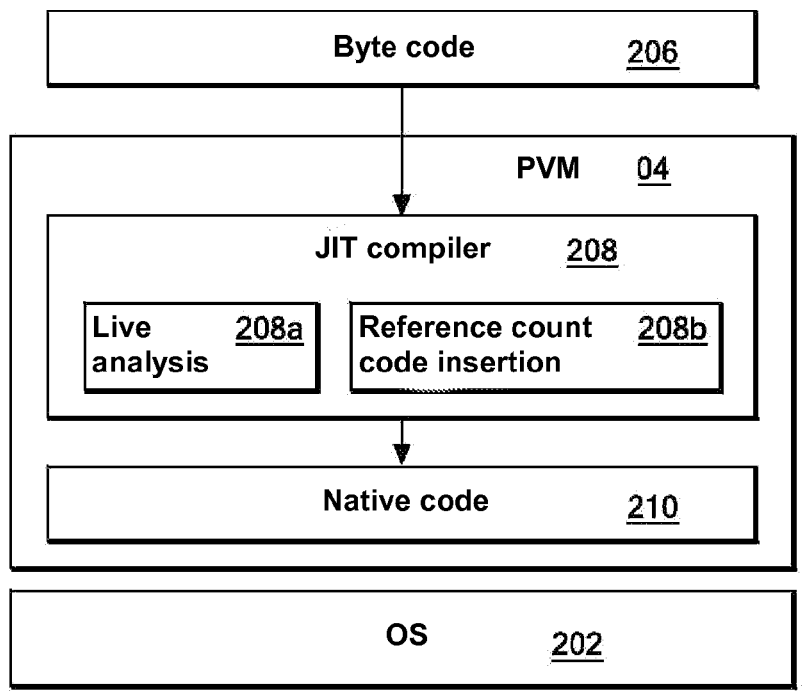
FIG. 2 is a block diagram of the software function configuration used to embody the present invention.

A JIT compiler 208 which is operated by the PVM 204 to convert the byte code 206 into native code 210 is also stored in the hard disk drive 108. The JIT compiler 208 parses the byte code 206, creates a control flow graph, performs a survival analysis on the variables, performs optimization on the intermediate processing language level, and finally inserts RC+/RC− code for garbage collection. In FIG. 2, the survival analysis routine 208a and the reference count code insertion routine 208b are shown as typical processing routines of the JIT compiler 208. A garbage collection function is implemented by the PVM 204 to recover an implemented object when the reference count related to the object reaches zero in accordance with the code inserted by the reference count code insertion routine 208b. The operations performed in the reference count code insertion routine 208b of the JIT compiler 208 will be explained below in greater detail with reference to the flowchart in FIG. 3 and FIG. 4.

While not shown in the drawings, Python source code and a program such as a byte code compiler for converting Python source code to byte code may also be stored in the hard disk drive 108.

The keyboard 110 and mouse 112 are used to manipulate graphic objects such as icons, task bars and text boxes displayed on the display 114 in accordance with the graphic user interface provided by the operating system (OS) 202.

There are no particular restrictions on the display 114. However, it is preferably a 32-bit true color LCD monitor with a resolution of 1024×768 or greater. The display 114 can be used, for example, to display the results of operations performed by application programs executed in the PVM.

The communication interface 116 is preferably connected to the network via the Ethernet® protocol. The communication interface 116 is used to receive processing requests from client computers (not shown) and to return processing results to client computers (not shown) in accordance with a communication protocol such as TCP/IP using functions provided by Apache.

When the operating system 202 launches the JIT compiler 208 via the PVM 204 in response to an operation performed using the keyboard 110 or the mouse 112, the byte code 206 of the application program is read by the JIT compiler 208 and converted to native code 210. The native code 210 generated in this way is executed by the operating system 202.

Figure 3:
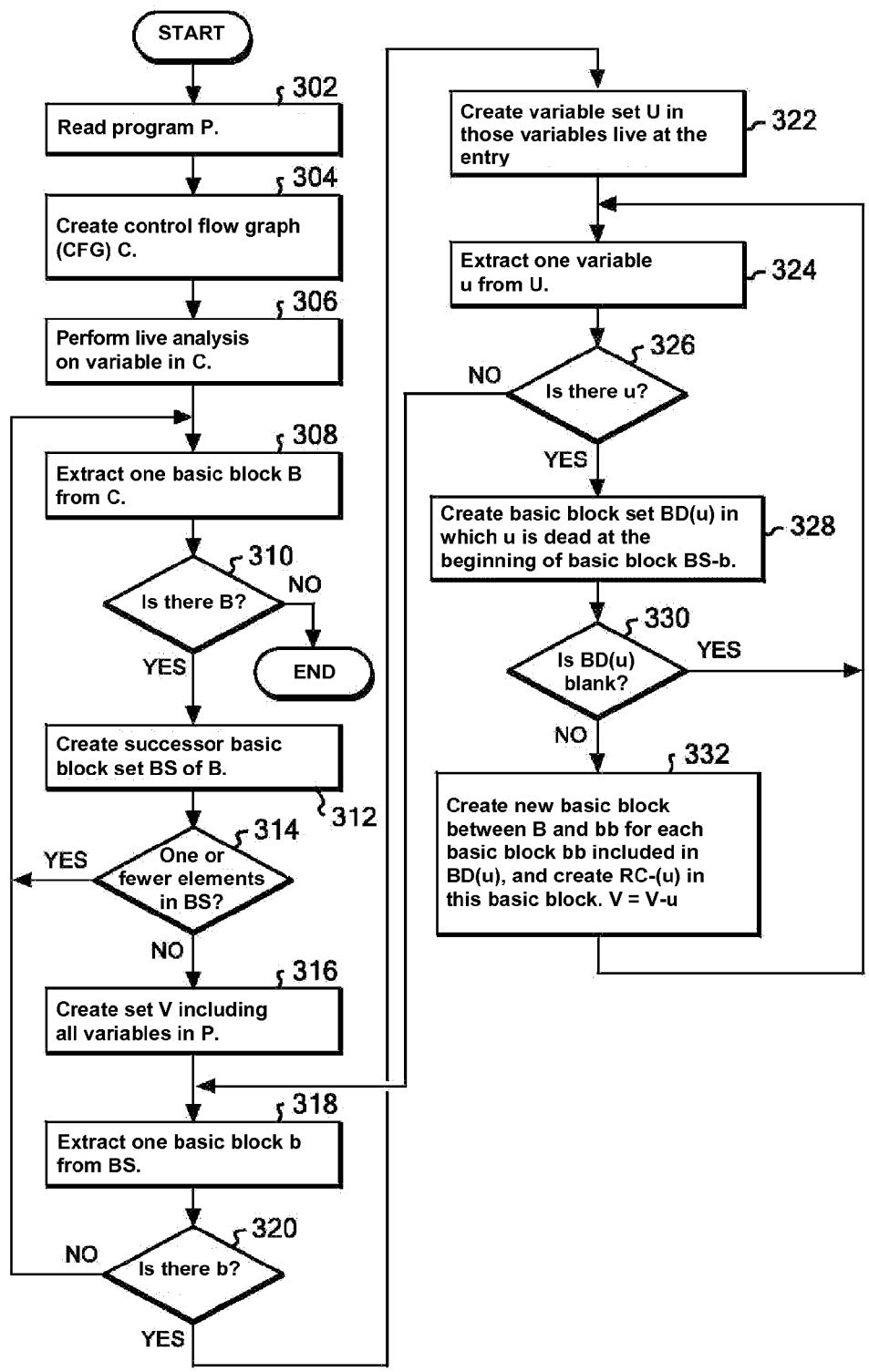
FIG. 3 is a flowchart of the process performed in the first embodiment of the present invention.

The following is an explanation, with reference to the flowchart in FIG. 3, of the processing performed by the JIT compiler 208 to insert reference count code. This processing is mostly executed by the reference count code insertion routine 208b of the JIT compiler 208. Because the reference count code insertion routine 208b is a portion of the JIT compiler 208, the JIT compiler 208 performs all of the operations in the following explanation for the sake of convenience.

In Step 302 of FIG. 3, the JIT compiler 208 reads the program P. Here, the program P is Python byte code 206.

In Step 304, the JIT compiler 208 creates the control flow graph (CFG) C of the program P.

Next, in Step 306, the JIT compiler 208 calls up the live analysis routine 208a on the basis of the control flow graph, and live analysis is performed on the variables in C. A live analysis routine performed on the basis of the control flow graph is described in chapter 10 of Andrew W. Appel, "Modern Compiler Implementation in ML", Cambridge University Press, 1998, so a detailed explanation is not provided here.

Next, in Step 308, the JIT compiler 208 attempts to extract a single basic block B from C. A basic block, which is a well-known concept in the field of compilers, is a continuous sequence of statements in which the flow of control begins at the starting point and ends at the end point without the possibility of terminating or branching off before reaching the end point.

When it has been determined in Step 310 that there is no basic block B to be extracted, the JIT compiler 208 ends the process.

When it has been determined in Step 310 that there is a basic block B to be extracted, the JIT compiler 208 in Step 312 creates a set BS of successor blocks of B.

In Step 314, the JIT compiler 208 determines whether or not there is one or fewer BS elements. If there is one or fewer elements, the process returns to Step 308, where an attempt is made to extract another basic block B that has not been extracted.

When it has been determined by the JIT compiler 208 in Step 314 that there are two or more elements in BS, the JIT compiler 208 in Step 316 creates a set V including all of the variables in the program P. In Step 318, an attempt is made to extract a single basic block b from the BS.

When it has been determined in Step 320 that there is no basic block b to be extracted, the process returns to Step 308 where the JIT compiler 208 attempts to extract another basic block B from C that has not been extracted.

When it has been determined in Step 320 that there is a basic block b to be extracted, the JIT compiler 208 in Step 322 creates a set U of variables that are live at the entry of b, and U=U∩V is established.

In Step 324, the JIT compiler 208 attempts to extract a single variable u from U. It is determined in Step 326 whether or not there is a u. If not, the process returns to Step 318. If there is a u, the JIT compiler 208 in Step 328 creates a set BD(u) of basic blocks in which u is dead at the beginning. In this set b is subtracted from BS, that is, BS-b.

In Step 330, the JIT compiler 208 determines whether or not BD(u) is empty. If it is empty, the process returns to Step 324.

If BD(u) is not empty, the JIT compiler 208 in Step 332 generates a new basic block between B and bb for each basic block bb included in BD(u), generates RC- (u) in the basic blocks, extracts variable u from variable set V according to V=V-u, and returns to Step 324.

The following is a summary of this process. When the basic blocks include two or more successor basic blocks, a given variable is live at the entry of one or more of the successor basic blocks, and the variable is dead in another basic block S, a new basic block is inserted between the original basic block and a successor basic block in which the variable is dead, and RC- related to the variable is generated in the new basic block.

When this process is explained using an equation, the following is established.

$$\left(\bigcup_{s \subset Succ(B) \wedge s \neq S} live_{in}(s)\right) \cap \neg live_{in}(S) \qquad \text{Equation 2}$$

A new basic block is generated in the program between basic block B and basic block S, and RC- for a variable the equation of that is not empty is generated. In this equation, Succ(B) is a set of successor basic blocks to basic block B, and livein(s) is a set of variables that is live at the entry of the basic block s. In addition, S is included in Succ(B).

Figure 4:
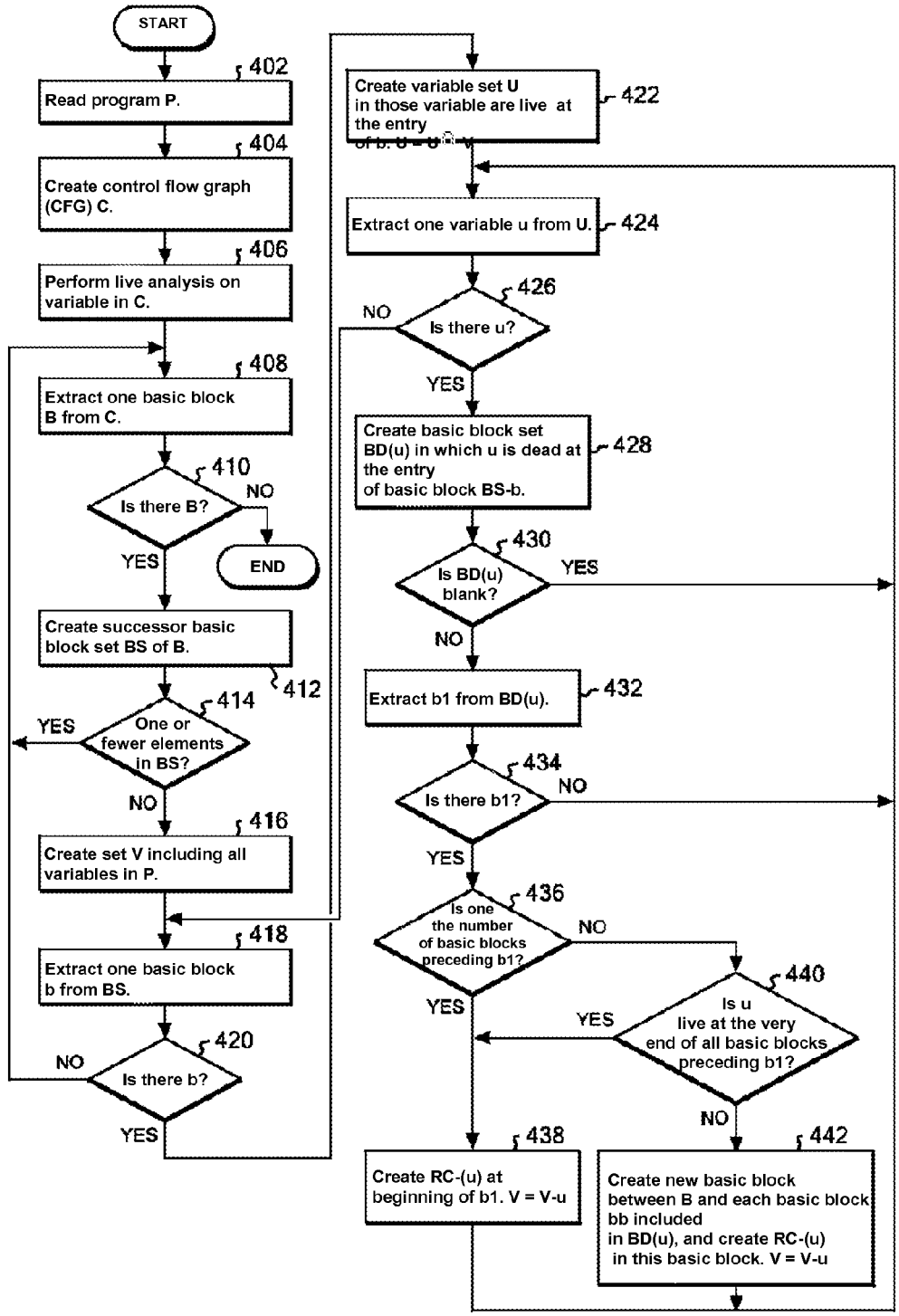
FIG. 4 is a flowchart of the process performed in the second embodiment of the present invention.

The following is an explanation of another embodiment of the processing in FIG. 3 with reference to the flowchart in FIG. 4. Most of the processing in the flowchart of FIG. 4 is the same as the processing in the flowchart of FIG. 3. In other words, Steps 402-430 in the flowchart of FIG. 4 is essentially the same as Steps 302-330 in the flowchart of FIG. 3. For example, Step 402 corresponds to Step 302, Step 404 corresponds to Step 304, and so on, all the way to Step 430 which corresponds to Step 330.

The explanation of Steps 402-430 provided above with reference to Steps 302-330, and the explanation of the processing in the flowchart of FIG. 4 begins from Step 430. In Step 430, the JIT compiler 208 determines whether or not BD(u) is empty. If it is empty, the process returns to Step 424.

When the JIT compiler 208 determines in Step 430 that BD(u) is not empty, an attempt is made in Step 432 to extract basic block b1 from BD(u).

The JIT compiler 208 determines in Step 434 whether or not there is a b1. If not, the process returns to Step 424.

When it has been determined in Step 434 that there is a b1, the JIT compiler 208 determines in Step 436 whether or not the number of basic blocks preceding b1 is 1. If the number is 1, in Step 438, RC-(u) is generated at the entry of b1, and u is extracted from V in accordance with V=V-u. The process then returns to Step 424.

When it has been determined that the number of basic blocks preceding b1 is not 1, the JIT compiler 208 in Step 440 determines whether or not u is live at the exits of all of the basic blocks in b1. If it is live, in Step 438, RC-(u) is generated at the entries of all of the basic blocks in b1, u is extracted from V in accordance with V=V-u, and the process then returns to Step 424.

When it has been determined in Step 440 that u is dead at the exits of all of the basic blocks of b1, the JIT compiler 208 in Step 442 generates a new basic block between B and each basic block bb included in BD(u), generates RC-(u) in the basic blocks, extracts variable u from variable set V according to V=V-u, and returns to Step 424. In Step 442, the same processing described in Step 332 of FIG. 3 is performed.

An example will now be explained in which the present invention has been applied to the following code.

```
foo(x, y, z) {
    if (z != 0) {
        t = x.add(y)
        if ((t == x) { return x; }
    }
    return z;
}
```

First, for comparison, the situation is shown when the technique described in U.S. Pat. No. 7,693,919 or in previously mentioned Joisha (2008) is applied.

Figure 5:
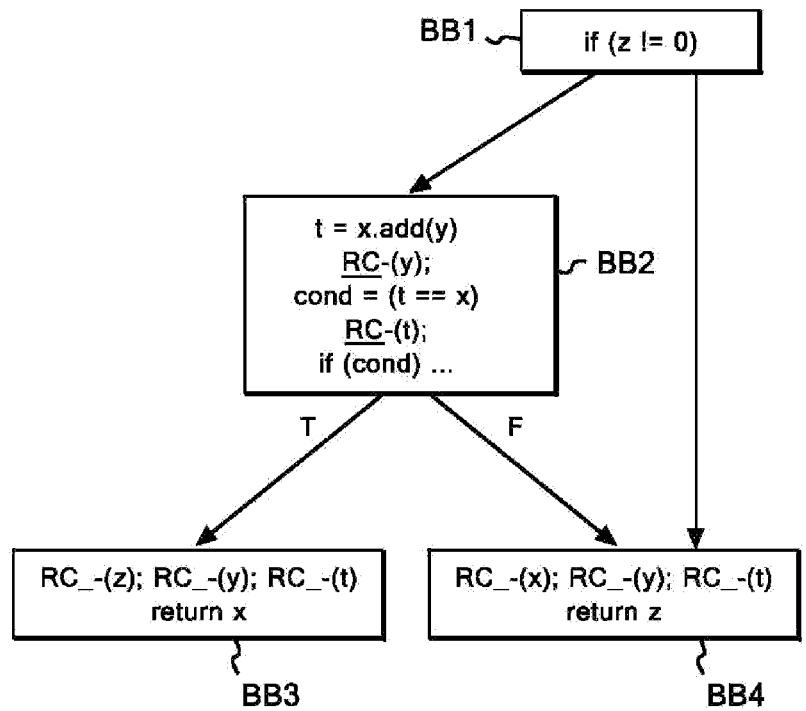
FIG. 5 is a diagram showing an example of a reference count insertion process performed in the prior art.

Then, it is divided into five basic blocks (BB1, BB2, BB3, BB4 and BB5) as shown in FIG. 5.

The equation below can be found in Joisha (1998).

$$D' = \left(live_{in}(B)) \cup \left(\bigcup_{s \in B} defs_{must}(s)\right)\right) - live_{in}(B') \qquad \text{Equation 3}$$

In this equation, defmust( ) is a required definition.

An attempt to calculate the situation in FIG. 5 is made using this equation. For B'=BB3, the following equation is established.

$B$=BB2:$live_{in}$(BB2)={$x,y,z$},$defs_{must}$
    ($s$ in BB2)={$t$}$live_{in}$(BB3)={$x$}

Using this value, the following equation is established.

$$D' \text{ for } BB3 = (live_{in}(BB2) \cup defs_{must}(s \text{ in } BB2)) - live_{in}(BB3)$$
$$= (\{x, y, z\} \cup \{t\}) - \{x\}$$
$$= \{y, z, t\}$$

For B'=BB4, the following equation is established.

$B$=BB1: $live_{in}$(BB1)={$x,y,z$},$defs_{must}$($s$ in BB1)={ }

$B$=BB2: $live_{in}$(BB2)={$x,y,z$},$defs_{must}$($s$ in BB2)={$t$}

Using this value, the following equation is established.

$$D' \text{ for } BB4 = ((live_{in}(BB1) \cup defs_{must}(s \text{ in } BB1)) \cup$$
$$(live_{in}(BB2) \cup defs_{must}(s \text{ in } BB2)))$$
$$- live_{in}(BB4)$$
$$= ((\{x, y, z\}) \cup (\{x, y, z\} \cup \{t\})) - \{z\}$$
$$= \{x, y, z, t\} - \{z\}$$
$$= \{x, y, t\}$$

For example, variable y is lastuse at x.add(y) in BB2, becoming dieacross(x.add(y))=y, and RC-(y) is inserted after x.add(y). Here, y=NULL is assigned for RC-( ) after the reference count is decremented in RC-( ) (DAN semantics). Also, RC_-(y) is inserted before BB3 and BB4 in accordance with D'. RC_-(y) is called RC(y) only if y is not NULL.

Figure 6:
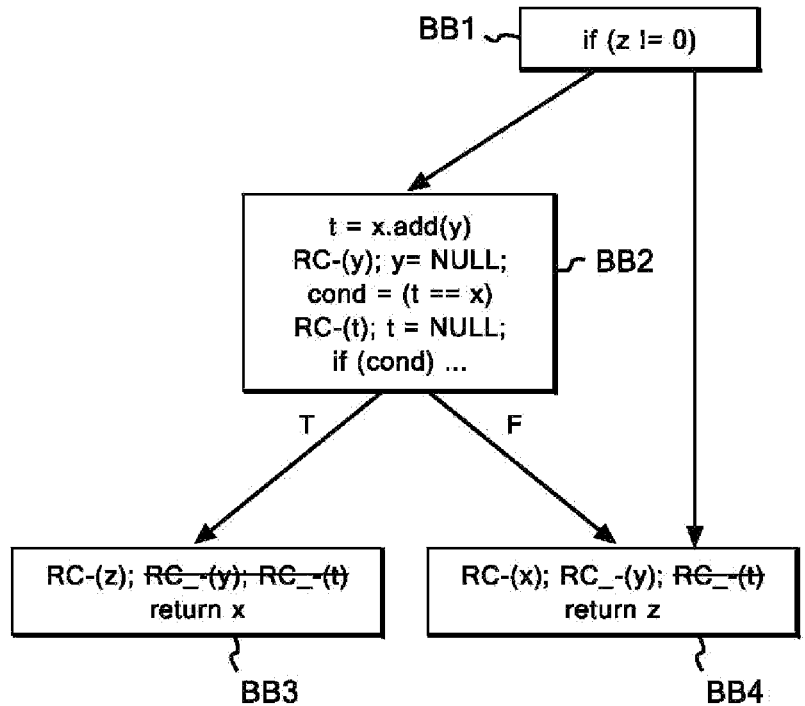
FIG. 6 is a diagram showing an example of a reference count insertion process performed in the prior art.

If optimization of constant propagation is introduced, which is not mentioned in U.S. Pat. No. 7,693,919 or previously mentioned Joisha (2008), y reaching BB3 is understood to always be NULL for RC_-(y), so RC_-(y) can be deleted. Also, the address of an object is not NULL due to the design of the implementation in CPython and YARV. In recognition of this, RC_-(z) in BB3 can be replaced with RC-(z), and RC_-(x) in BB4 can be replaced with RC-(x). The code optimized in this manner is shown in FIG. 6. In other words, the number of instructions executed is increased in BB4, even though it always checks to determine whether y is NULL, and it is not required after the execution came from BB2.

Figure 7:
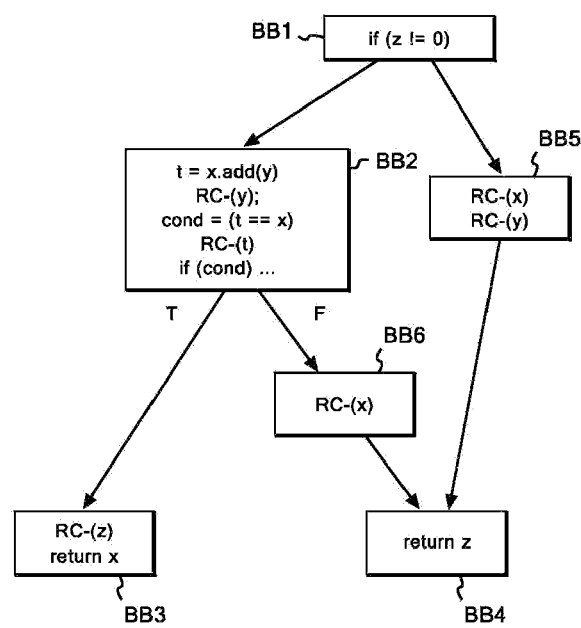
FIG. 7 is a diagram showing an example of a reference count insertion process performed in the present invention.

FIG. 7 shows the situation when the present invention is applied. Here, the following equation is established.

$$\text{live}_{in}(BB2)=\{x,y,z\}, \text{live}_{in}(BB4)=\{z\}$$

When BB B=BB1, and BB S=BB4, the following equation is established.

$$\text{live}_{in}(BB2) \cap \text{live}_{in}(BB4)=\{x,y\}$$

A new BB5 is inserted between BB1 and BB4, and RC-(x) and RC-(y) are generated. Then, unused objects x and y can be reclaimed via the path BB1→BB4. Similarly, BB6 is inserted in the path BB2→BB4, and RC-(x) is generated.

The process for inserting RC+ code was not mentioned in the explanation, but RC+ can be inserted in accordance with the prior art.

Unlike the code in FIG. 5 and FIG. 6, the code in FIG. 7 does not require the following operations.

The address of an object does not have to be rendered NULL after the last use of the object.

RC- does not have to be used in successor basic blocks in the case of variables whose life time has been within a basic block.

A check is not required to determine whether or not an address of the object has been rendered NULL at RC-.

The present invention was explained with reference to an example using a JIT compiler in Python. However, the present invention is not limited to this example. It should be understood that the present invention is suitable for use in any processing system used to implement reference count-type garbage collection such as PHP.

What is claimed is:

1. A computer-implemented code conversion method for reading program code and inserting reference count decrement code (RC-) to decrement a reference count into code having two or more successor basic blocks to a first basic block, the method comprising the step of:
   responding to a variable, the variable identical to a variable that is live at the entry of a second basic block among the successor basic blocks and that is not live in a third basic block separate from the second basic block among the successor basic blocks, by inserting a new fourth basic block between the first basic block and the third basic block, and by inserting RC- related to the variable in the new fourth basic block;
   wherein RC- is not inserted in a successor basic block in the case of a variable having a lifetime within a proceeding basic block; and
   wherein after a given RC- insertion:
   (a) an address of an object does not need to be rendered NULL after the last use of the object; and
   (b) a check is not required to determine whether or not the address of the object has been rendered NULL at the given RC- insertion.

2. The method of claim 1, wherein the program code is a Python byte code, and the RC- is inserted into native code generated by a just-in-time (JIT) compiler in a Python virtual machine (PVM).

3. A computer-implemented code conversion method for reading program code and inserting reference count decrement code (RC-) to decrement a reference count into code having two or more successor basic blocks to a first basic block, the method comprising on condition that a variable identical to a variable that is live at the entry of a second basic block among the successor basic blocks and is not live in a third basic block separate from the second basic block among the successor basic blocks, the method comprising the steps of:
   (a) inserting RC- code at the entry of the third basic block when the number of basic blocks preceding the third basic block is 1; and
   (b) inserting RC- code at the entry of the third basic block when the number of basic blocks preceding the third basic block is 2 or more and the variable is live at the exits of all of the preceding basic blocks;
   wherein RC- is not inserted in a successor basic block in the case of a variable having a lifetime within a proceeding basic block;
   wherein after a given RC- insertion:
   (a) an address of an object does not need to be rendered NULL after the last use of the object; and
   (b) a check is not required to determine whether or not the address of the object has been rendered NULL at the given RC- insertion.

4. The method of claim 3, wherein the program code is a Python byte code, and the RC- is inserted into native code generated by a just-in-time (JIT) compiler in a Python virtual machine (PVM).

5. A computer-executable code conversion program stored in a non-transitory computer-readable medium for reading program code and inserting reference count decrement code (RC-) to decrement a reference count into code having two or more successor basic blocks to a first basic block, the program executing in a computer the step of:
   responding to a variable, the variable identical to a variable that is live at the entry of a second basic block among the successor basic blocks and that is not live in a third basic block separate from the second basic block among the successor basic blocks, by inserting a new fourth basic block between the first basic block and the third basic block, and by inserting RC-code related to the variable in the new fourth basic block;
   wherein RC- is not inserted in a successor basic block in the case of a variable having a lifetime within a proceeding basic block; and
   wherein after a given RC- insertion:
   (a) an address of an object does not need to be rendered NULL after the last use of the object; and
   (b) a check is not required to determine whether or not the address of the object has been rendered NULL at the given RC- insertion.

6. The program of claim 5, wherein the program code is a Python byte code, and the RC- is inserted into native code generated by a just-in-time (JIT) compiler in a Python virtual machine (PVM).

7. A computer-executable code conversion program stored in a non-transitory computer-readable medium for reading program code and inserting reference count decrement code (RC−) to decrement a reference count into code having two or more successor basic blocks to a first basic block, the program executing in a computer, on condition that a variable identical to a variable that is live at the entry of a second basic block among the successor basic blocks and is not live in a third basic block separate from the second basic block among the successor basic blocks, the program executing in a computer the steps of:
  (a) inserting RC− code at the entry of the third basic block when the number of basic blocks preceding the third basic block is 1; and
  (b) inserting RC− code at the entry of the third basic block when the number of basic blocks preceding the third basic block is 2 or more and the variable is live at the exits of all of the preceding basic blocks;
  wherein RC− is not inserted in a successor basic block in the case of a variable having a lifetime within a proceeding basic block; and
  wherein after a given RC− insertion:
  (a) an address of an object does not need to be rendered NULL after the last use of the object; and
  (b) a check is not required to determine whether or not the address of the object has been rendered NULL at the given RC− insertion.

8. The program of claim 7, wherein the program code is a Python byte code, and the RC− is inserted into native code generated by a just-in-time (JIT) compiler in a Python virtual machine (PVM).

9. A computer-implemented system including a central processing unit (CPU) for reading program code and inserting reference count decrement code (RC−) to decrement a reference count into code having two or more successor basic blocks to a first basic block,
  the system executing in a computer a means of responding to a variable, the variable identical to a variable that is live at the entry of a second basic block among the successor basic blocks and that is not live in a third basic block separate from the second basic block among the successor basic blocks, by inserting a new fourth basic block between the first basic block and the third basic block, and by inserting RC− related to the variable in the new fourth basic block;
  wherein RC− is not inserted in a successor basic block in the case of a variable having a lifetime within a proceeding basic block; and
  wherein after a given RC− insertion:
  (a) an address of an object does not need to be rendered NULL after the last use of the object; and
  (b) a check is not required to determine whether or not the address of the object has been rendered NULL at the given RC− insertion.

10. The system of claim 9, wherein the program code is a Python byte code, and the RC− is inserted into native code generated by a just-in-time (JIT) compiler in a Python virtual machine (PVM).

11. A computer-implemented code conversion system including a central processing unit (CPU) for reading program code and inserting reference count decrement code (RC−) to decrement a reference count into code having two or more successor basic blocks to a first basic block, the system executing in a computer, on condition that a variable identical to a variable that is live at the entry of a second basic block among the successor basic blocks and is not live in a third basic block separate from the second basic block among the successor basic blocks, a means of:
  (a) inserting RC− code at the entry of the third basic block when the number of basic blocks preceding the third basic block is 1; and
  (b) inserting RC− code at the entry of the third basic block when the number of basic blocks preceding the third basic block is 2 or more and the variable is live at the exits of all of the preceding basic blocks;
  wherein RC− is not inserted in a successor basic block in the case of a variable having a lifetime within a proceeding basic block; and
  wherein after a given RC− insertion:
  (a) an address of an object does not need to be rendered NULL after the last use of the object; and
  (b) a check is not required to determine whether or not the address of the object has been rendered NULL at the given RC− insertion.

12. The system of claim 11, wherein the program code is a Python byte code.

13. The system of claim 12, wherein the RC− is inserted into native code generated by a just-in-time (JIT) compiler in a Python virtual machine (PVM).

* * * * *